United States Patent [19]

Peterson

[11] 4,195,828
[45] Apr. 1, 1980

[54] BOILER TUBE WELDING CLAMP

[76] Inventor: Donald M. Peterson, 7031 Ramoth Dr., Jacksonville, Fla. 32218

[21] Appl. No.: 4,752

[22] Filed: Jan. 19, 1979

[51] Int. Cl.² ............................................. B23K 37/04
[52] U.S. Cl. .................................. 269/43; 228/49 B; 269/152; 269/287; 269/321 N
[58] Field of Search ................... 269/43, 45, 152, 249, 269/246, 287, 321 N, 98; 228/99

[56] References Cited

U.S. PATENT DOCUMENTS

| | | | |
|---|---|---|---|
| 2,105,954 | 1/1938 | Rippe | 269/43 |
| 2,381,584 | 8/1945 | Fulleton | 269/43 |
| 4,105,344 | 8/1978 | Rousom | 269/249 |

Primary Examiner—Robert C. Watson
Attorney, Agent, or Firm—George H. Baldwin; Arthur G. Yeager

[57] ABSTRACT

A boiler tube clamp for axially aligning adjacent tube sections during welding comprising a U-shaped bracket including spaced free end portions and a curved intermediate portion for nestingly receiving a tube end portion. An elongated pin is removably connected to the free end portions for caging the pipe end portion therebetween. An elongated element is attached to the intermediate portion and includes angularly disposed contact surfaces for engaging spaced peripheral portions of the tube end portion. A brace member is integral with the bracket and includes an elongated portion offset from and extending generally opposite and parallel in the elongated element. An adjustable, threaded positioning member is carried by the offset portion for forcibly moving the adjacent tube section into alignment with the tubesection caged in the U-shaped bracket.

15 Claims, 4 Drawing Figures

BOILER TUBE WELDING CLAMP

BACKGROUND OF THE INVENTION

1. Field of the Invention

This invention relates to a device for maintaining two adjacent pipe or boiler tube sections in axial alignment during welding. More particularly, the present invention relates to a device for aligning adjacent vertical tube sections wherein a relatively small clearance exists between adjacent horizontal tube sections and/or other adjacent structures. For example, the present invention is particularly suited for application to an array of closely spaced, parallel tube sections of boilers and the like joined with narrow membrane, fins or webs wherein portions of the webs are removed from one tube section to permit such device to be applied to such tube section for alignment of another tube section therewith and welding the aligned tube sections together.

2. Prior Art

With the widespread use of welding to join tubes, pipes, plates, and other structural members, various devices and clamps have been developed to provide support for such members during the welding procedure. Generally, welding devices and welding clamps are designed to maintain such members in proper alignment during the welding procedure and permit an increase in the efficiency, economy and quality of the workmanship.

In welding pipe sections for pipelines, conduits and the like, it is generally desirable to maintain such adjacent pipe sections in axial alignment with their adjacent end portions in closely contiguous relationship while the welds are completed. For example, a number of welding clamps commonly applied to pipes and pipelines are of the type that encircle one or both of the contiguous pipe end portions and are designed to force and maintain such adjacent end portions in proper alignment. However, although many of these welding clamps are adjustable to fit different sizes of pipe diameters, such devices are often complex in construction, difficult to assembly and operate and require considerable time to quickly and properly attach and detach to the pipe sections. Additionally, such devices often restrict access to the welding areas so that the welding clamps must be removed or repositioned before the weld is completed. Such difficulties are particularly critical when the welding clamps are applied to pipe or boiler tube sections wherein access thereto is limited by closely adjacent tube sections and other structures.

Welding clamps which are designed to encircle the adjacent end portions of pipe sections are generally disclosed in U.S. Pat. Nos. 2,530,969, 3,920,232, 3,925,854 and 3,952,936. Additionally, U.S. Pat. Nos. 2,108,077, 2,381,584 and 3,666,159 disclose other welding clamps which employ adjusting features to maintain such adjacent pipe sections in alignment. Further, U.S. Pat. No. 3,128,736 discloses a raising-supporting-aligning jig employed in welding of an array of adjacent boiler tubes. Although the aforementioned patents generally provide adjusting features for attaching the pipe clamps to a selected pipe section, none of such pipe clamps are generally designed for rapid assembly and disassembly particularly where the clearance to the pipe section is limited. A welding clamp constructed according to the present invention is intended to overcome various problems, such as limited applicability in restricted areas, and other problems which may be encountered when welding together boiler tube sections having interconnected webs between the tubes of respective end to end array of tubes.

SUMMARY OF THE INVENTION

In accord with this invention a welding clamp for maintaining two adjacent end to end tube sections in axial alignment during welding comprises a bracket member for accommodating a tube section, pin means engaged with the bracket member for caging the tube section therebetween, spaced contact means connected to the bracket for engaging spaced peripheral portions of the tube section and brace means connected to the bracket and adapted to forcibly position an adjacent tube section in axial alignment with the tube section in axial alignment with the tube section engaged by the bracket intermediate portion.

An aspect of this invention relates to a U-shaped bracket member including spaced end portions and an intermediate portion having an inner surface portion conforming substantially to and adapted to be juxtaposed with an outer portion of the tube section. Locking means in the form of an elongated pin engages each of the bracket end portions and forms an abutment for the tube section and cages the tube section in the space defined between the bracket end portions and the bracket intermediate portion.

Another aspect of this invention relates to spaced contact means comprising angularly disposed contact surfaces for engaging spaced peripheral portions of the tube section. Such contact means, locking means and bracket member cooperatively engage the tube section and form a support for an adjacent tube section carried by the brace means.

In accord with a further aspect the brace means comprises a brace member connected to the bracket member and includes an offset elongated portion extending in an opposite but generally parallel direction to the spaced contact means and towards an adjacent tube section. An adjustable positioning means is connected to the offset portion for forcibly positioning the adjacent tube section in alignment with the adjacent tube section caged by the bracket member.

Therefore, it is a general object to provide an improved welding clamp which can be quickly and easily applied to adjacent tube sections and which can also be readily removed therefrom when the welding operation is completed.

Another object is the provision of an improved boiler tube welding clamp which will be relatively simple and inexpensive to manufacture; easy to assemble, operate and adjust; and durable in use.

Further objects are to provide a welding clamp which will not be unduly heavy or cumbersome and which will not hinder the welding of adjacent boiler tube sections.

A specific object is to provide a welding clamp for tube sections of selected sizes which requires a minimum of adjustment when transferred from tube section to tube section.

Another specific object is to provide an improved tube alignment and welding clamp wherein minimum adjustments thereof may be easily made by hand operations.

A further specific object is to provide a welding clamp wherein the entire joint between aligned boiler tubes is accessible to the welder without necessitating adjustment of the clamp.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENT

Figure 1:
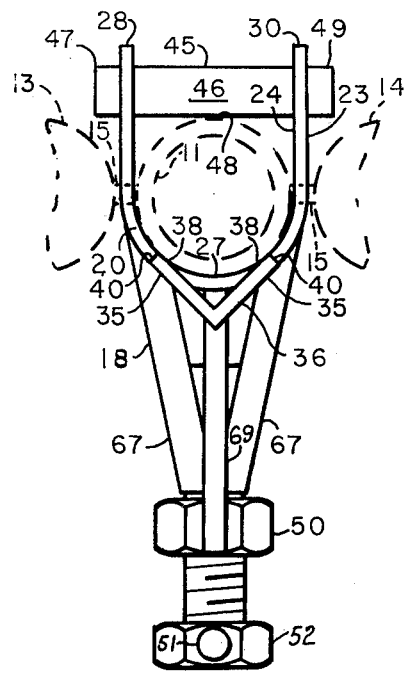
FIG. 1 is an end elevational view of the improved welding clamp viewed in the longitudinal direction of an array of boiler tube sections shown in broken lines.

Referring now to the invention illustrated in FIGS. 1-4, the welding clamp 18 generally comprises a bracket member 20 designed to partially encircle a tube section 11, pin means 45 removably attached within a pair of aligned openings 25 in end portions 28 and 30 of the bracket member 20 for caging such tube section 11 therebetween, and spaced contact means 35 in the form of a V-shaped element 36 for engaging spaced peripheral portions of the tube section 11. Additionally, the welding clamp 18 includes a brace means 31 connected to the bracket member 20 and designed to support another tube section 12 in contiguous, adjacent end to end relationship to the tube section 11 engaged by bracket member 20.

Figure 2:
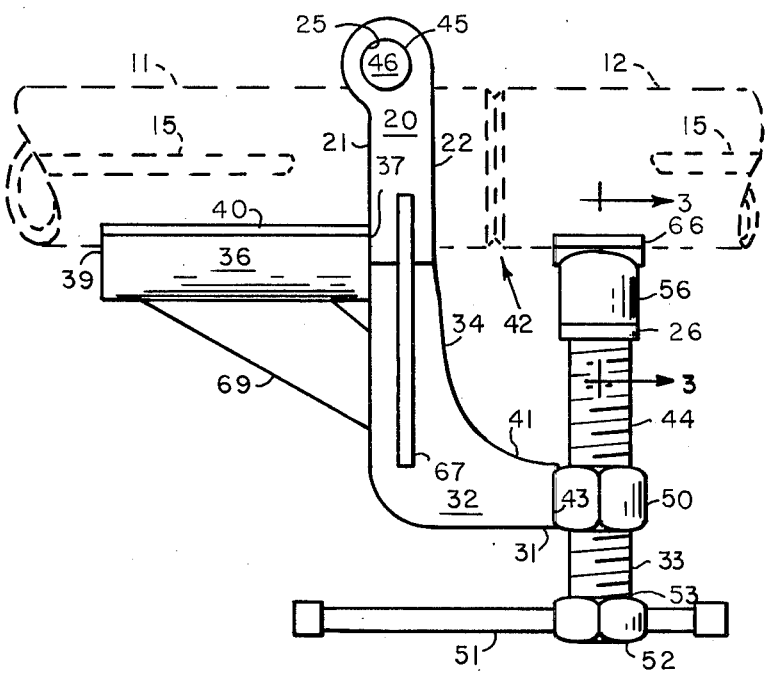
FIG. 2 is a side elevational view of the clamp of FIG. 1 applied to one end of a tube section and supporting a confronting end of another tube section that has been aligned and is to be joined thereto; such tube sections being shown in broken lines.
Figure 3:
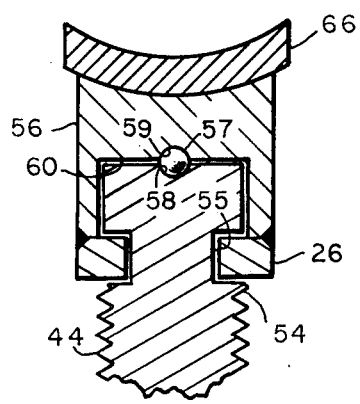
FIG. 3 is a partial sectional view taken along line 3—3 of FIG. 2.
Figure 4:
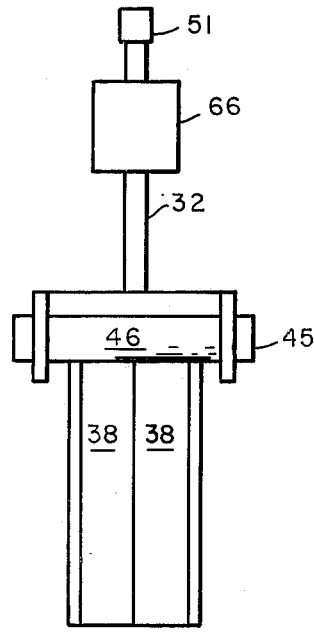
FIG. 4 is a top plan view of the clamp of FIG. 1.

As shown in FIGS. 2 and 4, bracket member 20, which is constructed to accomodate a particular size or diameter of tube section, includes a rear edge portion 21, a front edge portion 22, an outer surface 23 and an inner surface 24. Preferably U-shaped as depicted in FIG. 1, bracket member 20 generally comprises an arcuate intermediate portion 27 and respective spaced end portions 28 and 30 which partially encircle pipe section 11. In the embodiment illustrated in FIG. 1, the inner surface region of intermediate portion 27 is curved, having a curvature which approximates that of tube sections designed to be received therein. Additionally, the inner surface regions of spaced end portions 28 and 30 are generally parallel so that bracket member 20 can be easily, yet snugly positioned and be nested on a selected tube section with the connecting web 15 removed therefrom. Thus, the thickness of the spaced end portions 28 and 30 is sufficiently wide to resist bending and/or harsh treatment by the welder but must be sufficiently narrow to permit such end portions from slipping between adjacent tube sections in the same array, ie., tube sections 11, 13 and 14 being in the same array with tube section 12 being in an adjacent end to end aligned array to be joined.

Welding clamp 18 is particularly useful for repairing a tube section which may have ruptured in a complete and joined array of closely spaced boiler tube sections where little clearance may exist between the adjacent structures. For example, a complete and joined tube array may include adjacent collinear tube sections 11 and 12 interposed between laterally displaced parallel tube sections 13 and 14. Accordingly, bracket end portions 28 and 30 are designed to be less than the width of webs 15 so as to permit such end portions to be inserted through openings formed by the removable of parts of the web portions 15 which hold the adjacent tube sections together, it being necessary to remove or otherwise cut-away portions of such webs in order to repair or replace a designated tube section. As shown in FIGS. 2 and 4, parts of webs 15 adjacent the end portion of pipe section 11 have been cut-away to enable bracket member 20 to be positioned thereon and, consequently, the thickness as well as the lateral widths of end portions 22 and 23 are designed to be relatively narrow to minimize the amount of the web parts which must be removed from the selected tube section.

Extending from the rear edge portion 21 of bracket member 20 are spaced contact means 35, preferably in the form of an elongated V-shaped element 36 having an end portion 37 welded or otherwise affixed to an intermediate portion 27 of bracket member 20. Elongated element 36 has angularly disposed contact surfaces 38 for engaging spaced peripheral portions of the tube section partially encircled by bracket member 20. The contact surfaces 38 may have portions thereof which are generally coplanar with respective inner surface regions of bracket intermediate portion 27 and which form elongated contact surfaces tangentially abutting a tube section received by bracket member 20. Thus, the elongated extent of contact surfaces 38 assists in more uniformly distributing the forces applied to tube section 11 as tube sections 11 and 12 are brought into alignment. Additionally, elongated element 36 includes spaced longitudinal edge portions 40, extending between opposite end portions 37 and 39 and dimensioned so that elongated element 26 can be positioned on tube section 11 without inhibiting or restricting the applicability of bracket member 20 to such tube section. For example, in FIGS. 1 and 2, edge portions 40 are spaced downwardly from respective web portions 15 such that bracket member 20 can, to a limited extent, be rotationally adjusted about tube section 11 before one of such edge portions engages a respectibe web portion 15.

Locking means 45 in the form of an elongated pin element 46 is adapted to engage within aligned openings 25 in each of bracket end portions 28 and 30 for nestingly caging a tube section in the space defined by pin element 46 and the bracket end portions 28 and 30 and intermediate portion 27. Preferably, elongated pin element 46 comprises opposite end portions 47 and 49 extending laterally outwardly of respective openings 25 so that the clamp may be easily attached to and removed from the tube sections. Additionally, pin element 46 includes a central portion 48 designed to abut a surface region of tube section 11 generally opposite to that surface region engaged by intermediate portion 27 of bracket member 20, to a limited extent, be rotationally adjusted about tube section 11 before one of such edge portions engages a respective web portion 15.

Brace means 31 for supporting another tube section 12 in contiguous, adjacent and end to end relationship to the tube section 11 engaged by bracket member 20 generally comprises a tube brace member 32 connected to bracket member 20 and an adjustable positioning means 33 connected to the brace member 32. Preferably in the form of an L-shaped element, brace member 32 includes a leg portion 34 welded or otherwise attached to an intermediate portion 27 of bracket member 20 and an offset portion 41 attached to leg portion 34 and extending in a generally parallel but opposite direction from elongated V-shaped element 36. Such a construction of the clamp generally permits an aligning force to be applied to an adjacent tube section 12 wherein bracket member 20 and elongated element 36 will be maintained in a relatively fixed position on pipe section 11. Additionally, the lengths of leg portion 34 and and offset portion 41 are sufficient not only to provide a working welding space 42 between adjacent tube sections 11 and 12 but also to adequately span the joint defined between tube sections 11 and 12 and to expose such joint entirely to the welder without adjustment of the clamp on the tube sections.

Extending from the distal end 43 of offset portion 41 is adjustable positioning means 33 for forcibly positioning and aligning an adjacent tube section 12 toward a tube section 11 embraced by bracket member 20. Preferably, adjustable positioning means 33 comprises an elongated, threaded shaft 44 extending through a threaded passageway not shown formed by a threaded nut 50 welded to the dista end 43 of offset portion 41. It is to be noted that the location of the distal end 43 and nut 51 and the shaft 44 threaded thereinto is offset spacedly away from the joint to be welded between tube sections 11 and 12, whereby a clear space 42 therearound exists for the welder to make the appropriate welded joint.

A handle 51 is slidingly attached through a bore (not shown) in another nut 52 welded onto the remote end 53 of shaft 44. At the opposite end 54 of shaft 44 a circumferential groove 55 is cut therearound and a telescoping member 56 is fitted onto end portion 54 and a split ring or washer 26 is welded thereto and caged within groove 55 whereby member 56 is rotatable with respect to shaft 54. A ball bearing 57 may be positioned within a race 58 formed in the end of the shaft 44 and a corresponding race 59 in the facing surface 60 of member 56. An arcuate member 66 is affixed on the end of member 56, oppositely disposed with respect to the washer 26, and the curvature thereof is generally equal to the outer radius of the tube 12 on which the clamp is designed to be used. Not only will a primary force being applied longitudinally by shaft 44, but lateral forces applied by the arcuate member 66 tend to more accurately align tube section 12 with tube section 11.

It is to be understood that arcuate member 66 may be in the form of a V-shaped member similar to V-shaped member 36. Also the arcuate shaped intermediate portion 27 of bracket member 20 might also be V-shaped if found to be desirable in the construction of the clamp disclosed herein. Appropriate spaced bracing or structural reinforcements 67 are provided between bracket member 20 and brace member 32 and a reinforcement base element 69 is suitably welded between V-shaped element or angle 36 and brace member 32.

In use the clamp in accord with this invention is used by a pair of welders-one on either side of an array of boiler tubes. If a repair is being done, the clamp ends 28 and 30 are pushed through openings in the webs 15 by a welder on the same side as handle 51, and another welder on the opposite side locates pin element 46 in spaced openings 25. Thereafter the one welder rotates the handle 51 to revolve the shaft 44 within nut 50 thereby forcibly moving shaft 44 longitudinally to align tube section 12 with tube section 11 caged, within bracket member 20. The welders on each side weld the joint and the pin element 46 is thereafter removed. In some cases the welders may spot weld in several circumerential spaced locations and remove the clamp before completion of the welded joint.

It is also to be understood that a tube section adjacent tube section 12, which might be longitudinally adjacent tube sections 13 or 14, may be brought into alignment and the welders can weld that joint before removing the clamp.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A device for maintaining two adjacent tube sections in axial alignment during welding of closely spaced, parallel tubes joined by webs comprising a bracket member for receiving a tube section including spaced end portions adapted to be positioned through web cutouts in connecting webs between adjacent tubes, said bracket member including an intermediate portion having an inner surface adapted to be disposed in abutting relationship with an adjacent outer surface portion of a tube section, contact means connected to said bracket and extending laterally therefrom and including angularly disposed contact surfaces spaced from said bracket for engaging spaced peripheral outer surface portions of a tube section, releasable means engaged with said bracket end portions for caging a tube section in the space defined by said bracket end and intermediate portions and said releasable means, a brace member connected to said bracket member including an elongated portion offset from said spaced contact means and extending generally laterally away from said bracket and generally opposite of said contact means and towards an adjacent tube section adapted to be welded after end to end alignment with a tube section, and adjustable positioning means connected to said offset portion for forcibly positioning and axially aligning an adjacent tube section with a tube section adapted to be engaged with said intermediate portion of said bracket and said contact means, said contact means and said adjustable positioning means being located remote from said bracket end portions and adjacent to and on respective sides of said bracket intermediate portion.

2. The device according to claim 1 wherein said contact means includes an elongated V-shaped element having one end thereof connected to said bracket intermediate portion, said spaced contact surfaces being located on respective legs of said V-shaped element.

3. The device according to claim 1 wherein said bracket intermediate portion includes a substantially arcuate surface portion for supportingly engaging an outer curved surface of a tube section.

4. The device according to claim 3 wherein said arcuate surface portion is uniformly curved and has a radius of curvature substantially equal to an outer radius of curvature of a tube adapted to be received therein.

5. The device according to claim 1 wherein said releasable means comprises an elongated pin engaged with said bracket end portions and adapted to abut an outer surface of a tube section disposable within said bracket.

6. The device according to claim 5 wherein said spaced end portions are substantially parallel, said end portion includes respective aligned openings for slidingly receiving said pin therein.

7. The device according to claim 1 wherein said contact means includes an elongated element, said elongated offset portion being substantially parallel with said elongated element and being disposed on one side of said bracket intermediate portion with said elongated element being disposed on the opposite side thereof.

8. The device as defined in claim 1 wherein said adjustable positioning means includes a threaded member affixed to said offset portion, said threaded member being located in a plane substantially parallel to two axially aligned tube sections to be butt welded and offset therefrom, said adjustable positioning means further including an elongated threaded shaft movably secured to said threaded member, said shaft extending laterally of two axially aligned tube sections to be joined, said adjustable positioning means including a rotating member mounted on one end portion of said shaft for contacting an adjacent tube section, said shaft and rotating member being rotatable and movable toward and away from an adjacent tube section and upon engagement therewith said rotating member ceases to rotate relative to an adjacent tube section whereby said shaft may continue to be rotated to force an adjacent tube section into axial alignment with a tube section caged in said space.

9. The device as defined in claim 8 wherein said shaft is substantially parallel to said bracket, said rotating member including an arcuate surface generally conforming to an outer surface portion of an adjacent tube being contacted by said arcuate surface, said arcuate surface being in substantial alignment with said inner surface of said bracket intermediate portion when two tube sections respectively engaged by said inner and arcuate surfaces are in axial alignment.

10. The device as defined in claim 9 wherein said contact means are substantially in alignment with said inner surface of said bracket intermediate portion.

11. A tube clamp for temporarily connecting adjacent, axially aligned tube sections to be welded in an array of closely spaced, parallel tubes joined by webs with the aligned ends of the tube sections provided with web cutouts for receiving portions of the clamp comprising a generally U-shaped bracket including an intermediate portion and spaced end portions, said intermediate portion being adapted to contact a tube section disposable in said bracket, said end portions being spaced a distance apart slightly greater than the diameter of a tube section to be received therebetween, said end portions being of a thickness smaller than a web connected between adjacent tubes, contact means connected to said bracket and being laterally spaced therefrom for engaging peripheral portions of a tube section disposable within said bracket, releasable means engaged with said end portions for caging a tube section in the space defined by said bracket end and intermediate portions and said releasable means, a tube brace member connected to said bracket member including an elongated portion offset from said spaced contact means and extending toward an adjacent tube section adapted to be welded after end to end alignment with a tube section caged within said space, and adjustable positioning means connected to said offset portion for forcibly positioning and axially aligning an adjacent tube section with a tube section prior to welding thereof.

12. The clamp according to claim 11 wherein said contact means includes an elongated V-shaped element having one end thereof connected to said bracket intermediate portion, said spaced contact surfaces being located on respective legs of said V-shaped element, said bracket intermediate portion includes a substantially arcuate surface portion for supportingly engaging an outer curved surface of a tube section.

13. The clamp according to claim 11 wherein said releasable means comprises an elongated pin engaged with said bracket end portions and adapted to abut an outer surface of a tube section disposable within said bracket, said spaced end portions being substantially parallel, said end portion includes respective aligned openings for sliding receiving said pin therein.

14. The clamp as defined in claim 11 wherein said adjustable positioning means includes a threaded member affixed to said offset portion, said threaded member being located in a plane substantially parallel to two axially aligned tube sections to be butt welded and offset therefrom, said adjustable positioning means further including an elongated threaded shaft movably secured to said threaded member, said shaft extending laterally of two axially aligned tube sections to be joined, said adjustable positioning means including a rotating member mounted on one end portion of said shaft for contacting an adjacent tube section, said shaft and rotating member being rotatable and movable toward and away from an adjacent tube section and upon engagement therewith said rotating member ceases to rotate relative to an adjacent tube section, whereby said shaft may continue to be rotated to force an adjacent tube section into axial alignment with a tube section caged in said space.

15. The clamp as defined in claim 14 wherein said shaft is substantially parallel to said bracket, said rotating member including an arcuate surface generally conforming to an outer surface portion of an adjacent tube being contacted by said arcuate surface, said arcuate surface being in substantial alignment with said inner surface of said bracket intermediate portion when two tube sections respectively engaged by said inner and arcuate surfaces are in axial alignment, said contact means being substantially in alignment with said inner surface of said bracket intermediate portion.

* * * * *